US007413024B1

(12) United States Patent
Simontacchi et al.

(10) Patent No.: US 7,413,024 B1
(45) Date of Patent: Aug. 19, 2008

(54) SELF-CLOSING VENT ASSEMBLY

(75) Inventors: John Simontacchi, San Rafael, CA (US); Steve Beck, San Rafael, CA (US); Ronald J. Loar, Berkeley, CA (US)

(73) Assignee: Vulcan Fire Technologies, Inc., San Rafael, CA (US)

( * ) Notice: Subject to any disclaimer, the term of this patent is extended or adjusted under 35 U.S.C. 154(b) by 0 days.

(21) Appl. No.: 11/726,173

(22) Filed: Mar. 19, 2007

Related U.S. Application Data

(63) Continuation-in-part of application No. 10/269,974, filed on Oct. 15, 2002, now Pat. No. 7,191,845.

(51) Int. Cl.

| | |
|---|---|
| ***A62C 2/06*** | (2006.01) |
| ***A62C 2/00*** | (2006.01) |
| ***A62C 3/07*** | (2006.01) |
| ***A62C 39/00*** | (2006.01) |
| ***B60H 1/00*** | (2006.01) |
| ***F24F 7/00*** | (2006.01) |

(52) U.S. Cl. ............................ 169/48; 454/69; 454/357

(58) Field of Classification Search .................. 169/48, 169/45, 49; 454/69, 357, 257, 258, 75; 137/67, 137/79

See application file for complete search history.

(56) References Cited

U.S. PATENT DOCUMENTS

| | | | | |
|---|---|---|---|---|
| 2,279,791 | A | 4/1942 | Lamb | |
| 3,976,825 | A | 8/1976 | Anderberg | |
| 4,093,818 | A | 6/1978 | Thwaites et al. | |
| 5,749,948 | A * | 5/1998 | Scholz et al. | 106/18.15 |
| 5,957,211 | A | 9/1999 | Geuken et al. | |
| 6,130,381 | A * | 10/2000 | Keith et al. | 174/17 VA |
| 6,256,948 | B1 | 7/2001 | VanDreumel | |
| 6,752,714 | B1 * | 6/2004 | Mann | 454/369 |

FOREIGN PATENT DOCUMENTS

| | | |
|---|---|---|
| GB | 1500913 | 2/1978 |
| GB | 2107183 | 4/1983 |

* cited by examiner

*Primary Examiner*—Darren W Gorman
(74) *Attorney, Agent, or Firm*—Thomas M. Freiburger

(57) ABSTRACT

A self-closing vent has its frame and a honeycomb screen coated with an intumescent material. When affixed to a wall with an opening the vent is normally open, allowing free flow of air through the opening, but when exposed to the heat of a fire, the intumescent material expands to close the vent, thereby preventing spread of the fire through the opening. The intumescent material preferably is FireFree 88, in a coating thickness of about 5 to 15 mils. In one preferred embodiment the vent opening is in a vehicle, between an engine compartment and a passenger space.

8 Claims, 3 Drawing Sheets

SELF-CLOSING VENT ASSEMBLY

This application is a continuation-in-part of application Ser. No. 10/269,974, filed Oct. 15, 2002, now U.S. Pat. No. 7,191,845.

BACKGROUND OF THE INVENTION

This invention relates to a fire-rated, self-closing vent for use in soffits and walls connecting the exterior of a building to its interior, or in interior walls or barriers or in ducts. The vent comprises a screen surrounded by a peripheral frame, the combination having no moving parts. The screen comprises cells which are coated with an intumescent. Under normal conditions the cells are open to freely pass air therethrough and serves to ventilate crawl spaces, attics, etc. When subjected to the elevated temperatures of an external fire, the intumescent expands to close the cells, thus preventing flames, heat, and gaseous fumes from entering the building.

Homes, offices, and other buildings are constructed and maintained so as to prevent the spread of internal fires from one room to another. Included in this effort has been the use of an intumescent coated screen or grill as a self-closing vent in interior air ducts or ventilation openings, between one part of a building and another. Such a vent is described in Lamb U.S. Pat. No. 2,279,791, to provide free air flow between interior spaces under normal conditions but so as to close when exposed to high temperatures. The patent describes basically a screen, essentially two-dimensional with an intumescent coating or being formed of an intumescent material, without details as to how to form such a screen. In one embodiment coated screen is of a expanded metal. The Lamb patent also discloses a sandwiched construction, within duct work, of a heat dissipating grid, the vent, and an air filter. Lamb discloses a preferred intumescent coating material comprising liquid sodium silicate mixed with a saturated solution of sodium bicarbonate, in preferred portions of 95%/5%.

See also U.S. Pat. Nos. 3,976,825, 4,093,818, 5,957,211, 6,256,948, and U.K. patent documents Nos. 1500913 and 2107183. The U.S. '818 patent cited above shows a cellular, honeycomb-type structure which is extremely elongated and is positioned in a duct way for surface lines, such as cables. The cables are fed directly through individual tubes defined by the elongated honeycomb structure, with the purpose being to close off air flow to these tubes in the high heat situation of a fire.

The two British patent documents both show hexagonally-shaped honeycomb-like cellular meshes coated with intumescent material for automatic closure under fire conditions. The metal mesh is designed to be used in ventilation openings or ducts.

Prior vents with intumescent coatings have not been constructed in the advantageous manner of the present invention described below.

SUMMARY OF THE INVENTION

The present invention overcomes the difficulties described above by providing a self-closing vent designed to replace existing vents which connect interior spaces of a building, or connect the exterior of a building with its interior. Further, the invention improves the construction of a self-closing vent with intumescent coating, in efficiency of production, installation and operation.

The present invention accomplishes the above by providing a self-closing vent coated with an intumescent coating, said self-closing vent either as original equipment or as a replacement for existing vents.

It is an object of the invention to provide a self-closing vent of efficient construction which prevents fire from spreading through vents which connect spaces in a building or connect interior and exterior spaces. These and other objects, advantages and features of the invention will be apparent from the following description of a preferred embodiment, considered along with the accompanying drawings.

DESCRIPTION OF PREFERRED EMBODIMENTS

Figure 1:
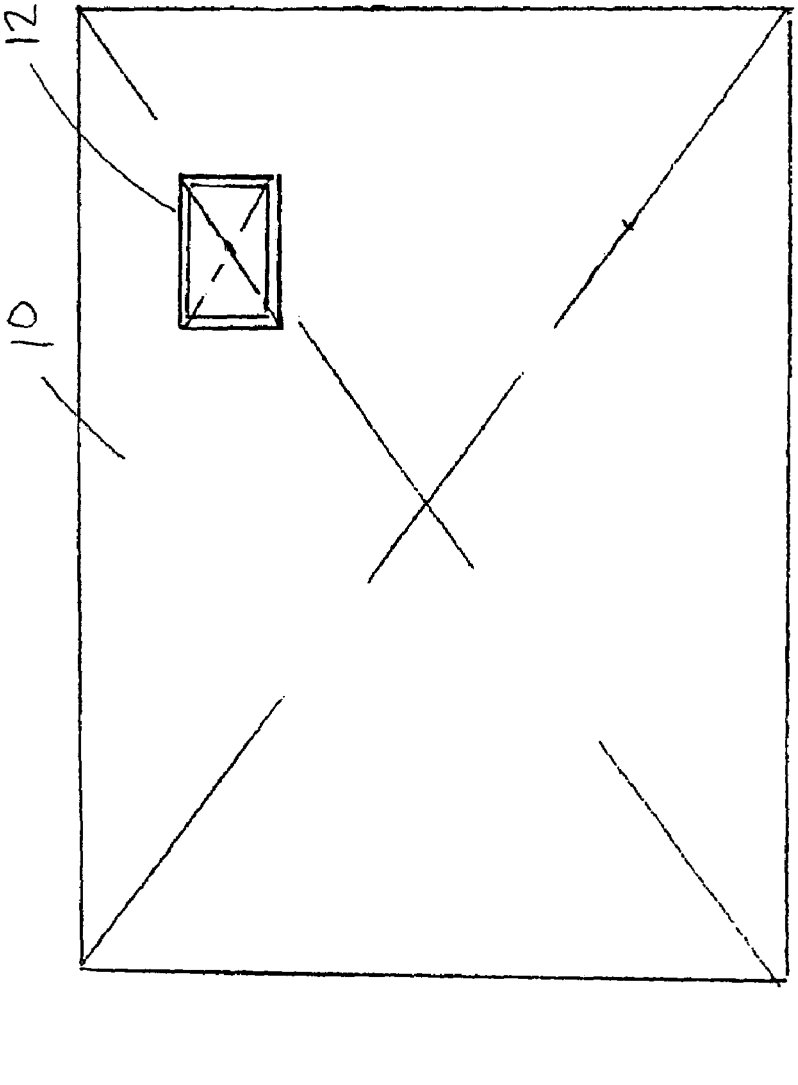
FIG. 1 is a schematic plan or elevation view showing a wall, which may be in a building, and illustrating the present invention.

In the drawings, FIG. 1 schematically shows a wall 10 with a passive self-closing vent or damper device 12 according to the invention installed in the wall. The wall 10 can be a wall of a building, interior or exterior, there may be a duct behind the wall in some cases. Ultimately, the wall 10 can be a firewall of a vehicle such as a car, bus, truck or other vehicle having an engine compartment. The firewall being positioned between a passenger space and an engine space. It should be understood that the wall 10 could also be a horizontal structure such as a soffit separating the exterior of a building from interior joist space or attic space, or it could be a floor or ceiling. The term "wall" is to be interpreted broadly herein, unless otherwise qualified.

Figure 4:
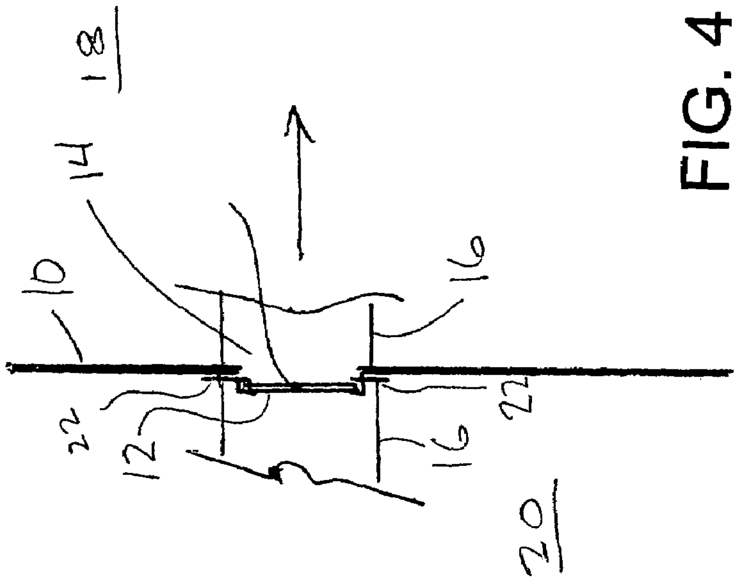
FIG. 4 is a schematic cross sectional elevation view showing one aspect of the invention.

FIG. 4, an elevation view, shows that the wall 10, in the case of a vehicle firewall, can be interrupted at an opening 14 through which air is ducted, and this may involve a duct 16 on one or both sides. In FIG. 4 the space 18 to the right of the wall 10 can be considered engine space, and the space 20 to the left of the wall can be considered passenger space. The self-closing vent 12 of the invention is shown installed over the firewall opening 14 in FIG. 4, as by brackets 22, or the item 22 can be a frame into which the self-closing vent mesh 12 is closely fitted, and this frame is secured to the firewall 10 by fasteners.

Copending application Ser. No. 10/269,974, issued as U.S. Pat. No. 7,191,845, and fully incorporated herein by reference, describes a particular use of an intumescent-coated self-closing vent essentially contemplated herein, used in a wall or soffit leading from exterior to interior space in a residential or other building. In accordance with the invention the self-closing vent described herein can be used between interior spaces of a building as well, or in other situations such as described above. The self-closing vent described herein can be used for interior/exterior or interior/interior venting installations.

Figure 3:
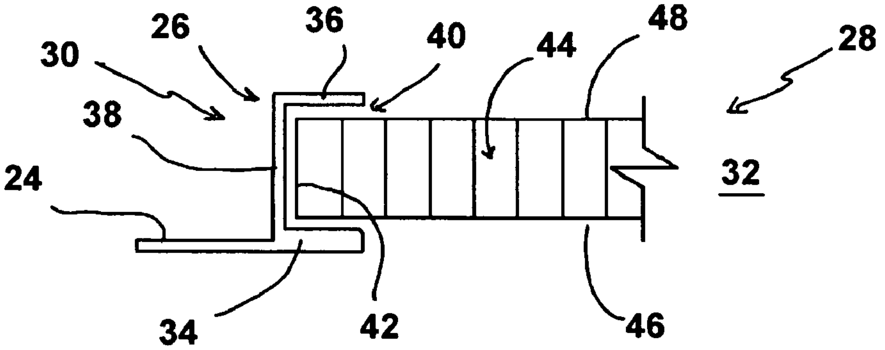
FIG. 3 is a side cross sectional view of the invention as seen along the line 3-3 in FIG. 2.
Figure 2:
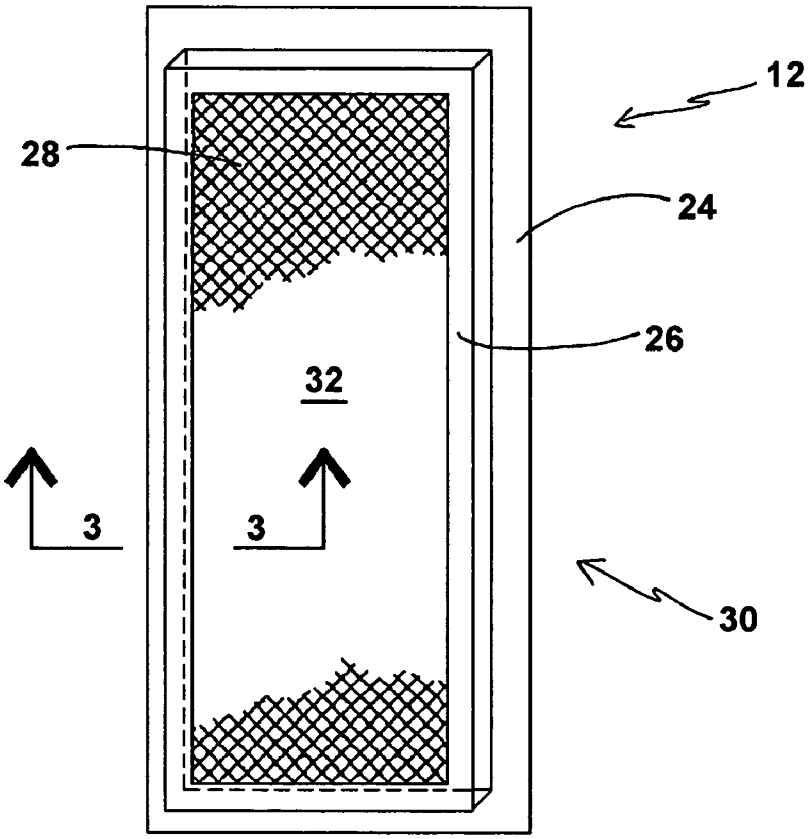
FIG. 2 is a rear perspective view of one preferred embodiment of the invention.

Turning to FIG. 2 a perspective back view of a preferred self-closing vent 12 of the invention is shown. Vent 12 comprises two parts, a combination peripheral flange 24 and integral U-shaped (in cross section) frame section or body 26, and a honeycomb screen 28. Flange 24 and U-shaped body 26 combine to form a one-piece frame 30 surrounding a central opening 32. The frame 30 is shown in the shape of a rectangle, but this is for illustrative purposes only. It could be any convenient geometric or decorative figure, e.g., a square, oval, hexagon, octagon, circle, star, etc. The flange 24 may be made, for example, of 22 gauge galvanized sheet metal and is substantially flat (FIG. 3). The U-shaped body 26 is offset relative to the plane of the flange 24. That is, as seen in FIG. 3, wherein one segment of the frame 30 is shown in cross-section in the direction of arrows 3-3 of FIG. 2, the frame section 26 comprises a first leg 34, a second leg 36, and a web 38 connecting legs 34 and 36. The hollow interior channel 40 of the U-shaped body 26 opens away from the web 38 toward the central opening 32.

In one preferred embodiment, the peripheral edge 42 of the screen 28 is rigidly secured within the channel 40, the body 26 by any convenient means, such as by welding, brazing, or by an epoxy adhesive. In this preferred embodiment, there is no relative movement of the screen 28 and frame 30, so the self-closing vent 12 can be literally characterized as a rigid, integral structure with no moving parts.

Other embodiments will also fall within the scope of the invention. For instance, the frame 30 could be constructed without the leg 36 and with the screen 28 secured either to the leg 34 or the web 38, or both. So long as the flange 24 of the frame 30 can be fastened to a surface of a wall and holds the screen 28 such that it covers the vent opening (not shown) in the wall, the desired results of the invention will be realized.

In the simplest construction, the screen 28 is cut to shape, and the frame 30 is assembled around it. In this most preferred embodiment, the screen 28 is not integral with the frame 30, but rather the peripheral edge 42 fits loosely within the hollow channel 40 of the frame section 26 and is completely contained therein. Even though slight movement is possible between the screen 28 and the frame 30, the vent 12 is considered as having no moving parts, inasmuch as any relative movement is inconsequential, producing neither a useful function nor any ill effects. The peripheral edge 42 follows the contours of the frame 30 very close to the web 38, so it will be appreciated that the screen 28 entirely covers the central opening 32 (FIG. 2).

The screen 28 preferably comprises a honeycomb structure having hexagonal cells 44 which are open through the screen from front 46 to back 48 ("honeycomb" herein, without more, includes hex, square or otherwise-shaped deep cells). The screen 28 may be about ⅛ inch to two inches thick, and preferably is in the range of about ⅛ inch to 1 inch thick. The thickness can be greater, up to two inches if desired. In a preferred form the screen is comprised of walls 50 formed of 3 mil stock aluminum, although the walls can be somewhat thinner or thicker if desired. Also, other materials may be used, such as steel, or even plastics including fiberglass-reinforced, or other composite materials, so long as they can withstand high temperatures.

The width of the cells 44 also can vary, from about ⅛ inch to ¼ inch, measured at the small dimension in hex openings (in the claims, "dimension" or "width" or "opening size" refers to this smaller dimension in hex openings, or to minimum dimensions from wall to wall of rectangular openings). The openings can be somewhat larger if the coating material expands sufficiently to close the opening when heated, even up to about ¾ inch.

The generally U-shaped frame piece 26 completely encloses any sharp edges that the peripheral edge 42 may have suffered during construction of the screen. With the frame 30 having a reasonably smooth exterior itself, the vent 12 is without sharp edges, a feature which facilitates better handling, storage, and transportation.

The vent 12 is coated in its entirety with an intumescent material. The coating in a preferred embodiment is about 5 mils thick (or preferably a range of about 5 mils to about 0.5 mils), so it is apparent that virtually the entire width of each cell 44 is open under ambient conditions for free flow of air. When exposed to high temperatures, such as those associated with a fire, however, the intumescent material expands and carbonizes to form a solid barrier which is impenetrable by heat or by gasses. In preferred embodiments of the invention the coating comprises the material FireFree 88, a paint-type coating that can be applied, in the case of the honeycomb vent structure, by spraying, dipping or electrostatic coating. The FireFree 88 material is manufactured by International Fire Resistant Systems of San Rafael, Calif. and is a readily available fire-resistant coating product and is in fact superior to all other known intumescent coatings for the purpose described. The product is ammonium polyphosphate based, with low activation temperature. In the claims the term high-performance ammonium polyphosphate-based intumescent coating is to be taken to mean this commercially available product. In this case the coating may be applied in approximately 5 mil thickness onto the walls of the honeycomb vent structure.

The shape and dimensions of the vent 12 will vary depending upon the intended location of use. A typical set of dimensions for the vent 12 is as follows: (1) The outside dimensions of the flange 24 are approximately 7¼ inches by 15¼ inches. (2) The outside dimensions of the U-shaped frame section 26 are approximately 5¾ inches by 11¾ inches. (3) The thickness of screen 28 is approximately ¼ to ¾ inch. (4) The width of web 38 is approximately 1/16 inch greater than the screen thickness. And, (5) the width of the legs 34 and 36 of the U-shaped member 26 is approximately ½ inch.

In use, for new building constructions, a vent opening is formed wherever appropriate in the walls, and the body 36 of the self-closing vent 12 is fitted therein. The flange 24 of the frame 30 is attached to the outside surface of a wall around the vent opening, such as the wall 10 in FIG. 1. To retrofit self-closing vent 12 to an existing building, the building's existing vents are removed, and each is replaced with a self-closing vent 12 mounted on the wall (as broadly defined above—can be a horizontal surface) as before. The flange 24 is pressed flat onto the wall with the U-shaped body 26 extending inwardly therefrom into a vent opening through the wall. The vent 12 is either shaped to fit an existing aperture, or a new aperture is formed having a dimension such that a standard body 26 fits snugly therewithin. The flange 24 is then fixed to the wall by suitable fasteners, e.g., screws, nails, etc. As is apparent from FIG. 3, the flange 24 is coplanar with the leg 34, so both present a smooth external surface, when flange 24 is attached flush onto an external wall. Any gaps which might exist between the wall and the vent 12 can be sealed with caulking or weatherstripping if deemed appropriate. Air will naturally flow freely through the cells 44 until the intumescent material is expanded by excessive heat, at which time all of the cells 44 as well as any gaps remaining between the vent 12 and the wall of the building will be sealed by the expanded intumescent (since the entire structure 12 preferably is coated), blocking all air flow and thereby preventing travel therethrough of any flames.

Figure 5:
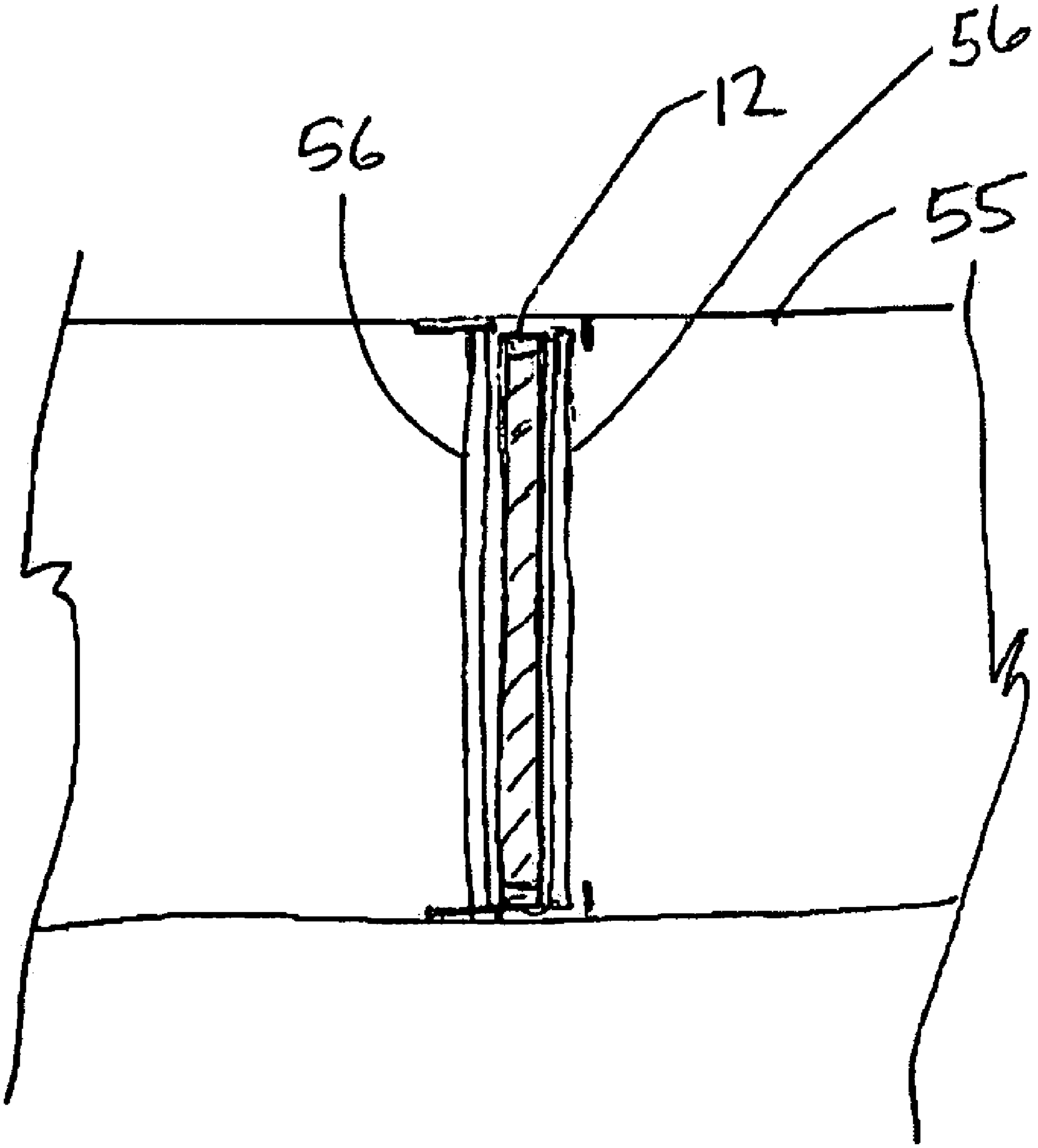
FIG. 5 is a schematic elevation view in section showing a self-closing vent juxtaposed with spark arresters, in an air duct.

Another feature of the invention is that the vent 12 of the invention can be used as layered together with an air filter or other type of filter, such as a spark arrester. This can be a fairly tight screen of metal or other material, or a fiberglass mat. A fiberglass mat is preferred, as a type of filter or barrier that allows free air flow, and such a mat can be in a thickness of about 1/16 inch to about ¼ inch or more if desired. The tight screen or fiberglass mat will prevent the passage of sparks, which could penetrate the vent 12 prior to the time the vent is heated to the point of closing. FIG. 5 is a simplified schematic representation, showing that, in the case of the self-closing vent 12 being located in air duct 55, a spark arrester or a filter 56 may be positioned on both sides. Pursuant to this invention such a spark arrester may be positioned on either side or both sides. Further, a fiberglass mat can be used on one side and a different type of spark arrester screen on the other side, if desired.

In the case where the vent 12 is positioned in a wall or ceiling or otherwise opening into a room, the filter or spark arrester 56 generally is positioned behind the vent 12, and only a single spark arrester is used.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A self-closing venting system for preventing fire from penetrating through vents, comprising in combination:

a wall with a vent opening, the wall comprising a firewall of a vehicle, dividing an engine compartment space from a passenger space, a self-closing vent, comprising:

a frame defining a central opening, a screen contained within the frame and covering the central opening while allowing free flow of air therethrough, the screen being formed in a honeycomb configuration with openings having a dimension of about ⅛ to ¾ inch and a depth of about ⅛ to 1 inch, the screen being coated with a layer of an intumescent material which closes the screen openings when subjected to heat produced by a fire, the intumescent material being a high-performance ammonium polyphosphate-based intumescent coating, and the self-closing vent being mounted on the wall to cover the vent opening.

2. A self-closing venting system for preventing fire from penetrating through vents, comprising in combination:

a wall with a vent opening, a self-closing vent, comprising:

a frame defining a central opening, a screen contained within the frame and covering the central opening while allowing free flow of air therethrough, the screen being formed in a honeycomb configuration with openings having a dimension of about ⅛ to ¾ inch and a depth of about ⅛ to 1 inch, the screen being coated with a layer of an intumescent material which closes the screen openings when subjected to heat produced by a fire, the intumescent material being a high-performance ammonium polyphosphate-based intumescent coating, and a spark arrester layer adjacent to and on one side of the self-closing vent, the self-closing vent being mounted on the wall to cover the vent opening.

3. The venting system of claim 2, wherein the spark arrester layer comprises a fiberglass mat.

4. In a vehicle having an engine within an engine compartment and a firewall positioned to protect a passenger space from the engine compartment, and the firewall including at least one opening between the engine compartment and the passenger space, a self-closing vent for preventing fire from traveling from the engine compartment through the opening into the passenger compartment, comprising:

a frame defining a central opening, a screen retained within the frame and covering the central opening while allowing free flow of air through the opening, the screen being formed in a honeycomb configuration with a multiplicity of openings from front to back of the screen bounded by cell walls, each opening having an opening size no larger than about ¾ inch, and the cell walls of the screen being coated with an intumescent material in such thickness and of such intumescent properties as to close the openings of the screen when subjected to heat produced by an adjacent fire.

5. The self-closing vent of claim 4, wherein the screen is about ⅛ to 1 inch in depth.

6. The self-closing vent of claim 5, wherein the screen is about ⅝ to ¾ inch in depth.

7. The self-closing vent of claim 4, wherein the openings in the screen are of size no larger than about ¼ inch.

8. The self-closing vent of claim 4, wherein the intumescent material comprises a high-performance ammonium polyphosphate-based intumescent coating.

* * * * *